No. 885,054. PATENTED APR. 21, 1908.
E. W. JUNGNER.
GAS ELEMENT FOR CONVERTING THE ENERGY OF COMBUSTIBLE OR OTHER SUITABLE REDUCING SUBSTANCES TO ELECTRIC CURRENT.
APPLICATION FILED MAY 15, 1907.
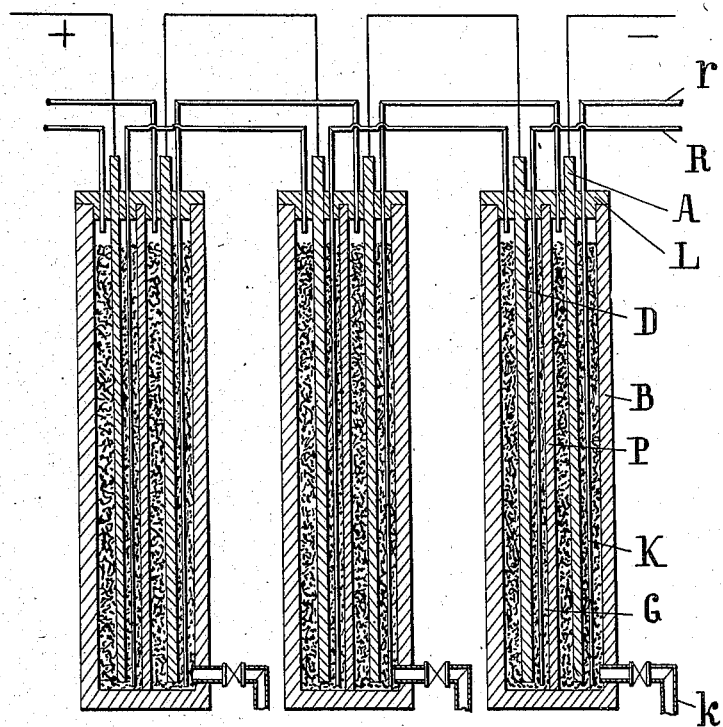
Witnesses.
Inventor.

UNITED STATES PATENT OFFICE.

ERNST WALDEMAR JUNGNER, OF KNEIPPBADEN, NORRKÖPING, SWEDEN.

GAS ELEMENT FOR CONVERTING THE ENERGY OF COMBUSTIBLE OR OTHER SUITABLE REDUCING SUBSTANCES TO ELECTRIC CURRENT.

No. 885,054.     Specification of Letters Patent.     Patented April 21, 1908.

Application filed May 15, 1907. Serial No. 373,799.

*To all whom it may concern:*

Be it known that I, ERNST WALDEMAR JUNGNER, a subject of the King of Sweden, residing at Kneippbaden, Norrköping, Sweden, have invented certain new and useful Improvements in Gas Elements for Converting the Energy of Combustible or other Suitable Reducing Substances to Electric Current; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The present invention has reference to an apparatus for converting the caloric energy of the reaction:

into electrical energy for the purpose of enabling the re-formation of sulfurous acid by means of the subsequent reduction of the sulfuric acid by means of carbon or other suitable reducing substance according to the following reaction:

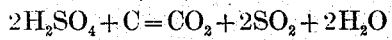

and thus the energy of the carbon be directly converted into useful electrical energy.

As one pole of galvanic elements with air as a depolarizer, it has previously been suggested that, among other reducing gases sulfurous acid be used, but, as far as I have found, not used in such a manner that a cyclic conversion of the energy of combustible materials has been either intended or attained.

The drawing illustrates an apparatus adapted for this purpose.

A vessel B of earthenware or other suitable material is divided into two separate compartments by means of a porous, non-conducting plate P for example of burnt clay. The plate is fastened to the walls of the vessel by means of a suitable cement, for example of linseed oil and minium.

In both compartments plates D and A of conducting carbon are inserted, preferably of graphite or of a suitable metal, of which plates the former, D, is intended as inactive conductor for the oxidizing electrode, the latter, A, as inactive conductor for the reducing electrode. Around the plate D are packed small pieces G of porous, electrically conducting carbon, advantageously of porous graphite, which are moistened with a solution of nitrosyl-sulfuric acid in sulfuric acid of high concentration. On each side of the plate A are also packed smaller pieces $k$, of porous, conducting carbon, which are here, however, saturated with concentrated sulfuric acid only and preferably consist of amorphous, conducting carbon, for instance of porous coke or gas-coal. The carbon-pieces are chosen of the smallest size possible, in order to attain the largest surface possible due regard, however, being taken that the spaces between them are not able to retain the electrolyte produced during the generation of current so that the said electrolyte can flow down to the bottom of the vessel by gravity. The porous division-wall is also saturated with sulfuric acid.

Through the cover L which closes the vessel as well as separates the two compartments gas-tight, pass the conductors A and D as well as the inlet and outlet-pipes R and $r$. By means of these pipes the gases may be conducted through the layers of carbon-pieces, in the manner illustrated on the drawing. A number of such elements may be united, as shown on the drawing.

If a current of air be conducted through the pipes R and a current of moistened sulfurous acid through the pipes $r$ and if the poles of the battery be connected by means of a suitable resistance, a constant electric current is obtained, passing outside the battery from D to A. The following reactions then occur:

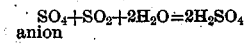

and

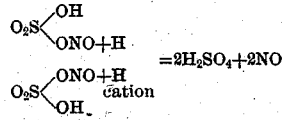

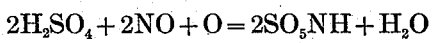

whereafter, in presence of air the reaction:

$$2H_2SO_4 + 2NO + O = 2SO_5NH + H_2O$$

immediately occurs. From this it is evident, that the final result is a union of sulfurous acid, oxygen and water to form sulfuric acid while the other reacting substances remain unchanged. The sulfuric acid is obviously formed at the pieces of coke around A and runs to the bottom of the vessel, where it may gradually be drawn off through valve k.

From the sulfuric acid formed sulfurous acid may in a well known manner be produced by heating it with a combustible substance as for example, coal, coke, charcoal, shavings, saw-dust or the like. Other suitable reducing substances may obviously also be employed.

On account of the influence of diffusion the acid drawn off will evidently contain nitrosyl-sulfuric acid and nitric oxid will be formed on account thereof upon its reduction with carbon. Said oxid may suitably be taken up in a solution of ferrous-sulfate and from there by means of slight heating driven into the current of oxygen passing through the battery, whereby nitrosyl-sulfuric acid is re-formed.

The carbonic acid accompanying the sulfurous acid is gradually collected in the last cell and ought therefore to be drawn off now and then. Other impurities, such as hydrogen, hydric sulfid, carbonic oxid, hydrocarbon and such like act reducingly and react similarly to the sulfurous acid to generate current. The reaction obviously taking place during absorption of water, which is thermochemically more strongly united to acids of high concentration than to acids with a lower per cent. of sulfuric acid and the degree of heat of the solution of the nitrosyl-sulfuric acid in sulfuric acid increased considerably with the increasing degree of concentration of the latter. The value of the tension of the energy in the element now described, is considerably dependent on the degree of concentration of the sulfuric acid. It varies from 0.5 volt at a medium concentration to 0.3 volt or less at a higher concentration.

If the sulfuric acid contain too much water the following reaction will spontaneously occur on account of the diffusion:

which takes place without generation of current and this implies a loss of energy and an unnecessary waste of sulfurous acid. With a highly concentrated sulfuric acid no reaction takes place between the sulfurous acid and the nitrosyl-sulfuric acid excepting in the presence of oxygen and thus not without a corresponding generation of current. Finally, sulfuric acid containing a large per cent. of water cannot generally, as is well known, be used for the production of sulfurous acid with reducing substances, without a previous concentration. The selection of degree of concentration of the acid thus depends upon the importance attached to the accurate utilization of the energy of the carbon in comparison to the cost and space occupied by the battery, the quality of the substance desired for the reduction of the sulfuric acid and such like.

I have found it advantageous to use an acid of about 80% $H_2SO_4$.

It is evidently much cheaper to start larger batteries of the kind herein described by employing other crude materials for the production of sulfurous acid, than the reduction of sulfuric acid by means of a reducing substance. Other known methods may evidently also be used, as for instance, combustion of sulfur, roasting of sulfur bearing mineral, reduction of sulfates with carbon and such like.

The air admitted to the battery may in any known manner be made richer in oxygen for instance, by filtration through a rubber membrane or the like.

I claim:

1. A galvanic gas element producing sulfuric acid comprising sulfurous acid, a suitable reducing substance and oxygen as a generating medium, and an electrolyte of sulfuric acid of such concentration as to be capable of reduction to sulfurous acid by reducing agents.

2. A galvanic gas element producing sulfuric acid, comprising sulfurous acid produced from sulfuric acid, carbon as a reducing substance, oxygen as a generating medium and an electrolyte consisting of sulfuric acid of such concentration capable of being reduced to sulfurous acid by reducing substances.

3. A galvanic gas element producing sulfuric acid, comprising sulfurous acid, carbon as a reducing substance, and oxygen as a generating medium, and a sulfuric acid electrolyte of such concentration as to be capable of reduction to sulfurous acid by carbonaceous substances, said sulfurous acid to be returned to the battery.

4. A galvanic gas element, an oxygen depolarizer, a generator comprising a reducing gas, nitrosyl-sulfuric acid dissolved in sulfuric acid and an electrolyte of sulfuric acid of high concentration.

In testimony, that I claim the foregoing as my invention, I have signed my name in presence of two subscribing witnesses.

ERNST WALDEMAR JUNGNER.

Witnesses:
T. BOIJE,
FRITHIOF NYLIN.